US007697725B2

(12) United States Patent
Burns et al.

(10) Patent No.: US 7,697,725 B2
(45) Date of Patent: Apr. 13, 2010

(54) METHOD AND APPARATUS FOR AUTONOMOUS OBJECT TRACKING

(75) Inventors: John Brian Burns, Palo Alto, CA (US); Michael Eriksen, San Francisco, CA (US); Carl Shapiro, Palo Alto, CA (US); Aaron Heller, Belmont, CA (US); Regis Vincent, San Mateo, CA (US)

(73) Assignee: SRI International, Menlo Park, CA (US)

( * ) Notice: Subject to any disclaimer, the term of this patent is extended or adjusted under 35 U.S.C. 154(b) by 1045 days.

(21) Appl. No.: 11/397,988

(22) Filed: Apr. 3, 2006

(65) Prior Publication Data

US 2007/0230742 A1    Oct. 4, 2007

(51) Int. Cl.
    *G06K 9/00* (2006.01)
(52) U.S. Cl. .................. 382/107; 382/103; 382/104
(58) Field of Classification Search ............. 382/103, 382/104, 107
    See application file for complete search history.

(56) References Cited

U.S. PATENT DOCUMENTS

| | | | | |
|---|---|---|---|---|
| 5,259,040 | A | * | 11/1993 | Hanna ................... 382/107 |
| 6,396,961 | B1 | * | 5/2002 | Wixson et al. ............ 382/294 |
| 7,007,888 | B2 | * | 3/2006 | Brunson et al. ........... 244/3.18 |
| 7,433,497 | B2 | * | 10/2008 | Chen ..................... 382/107 |

OTHER PUBLICATIONS

Burt et al, "Object Tracking With a Moving Camera", Visual Motion, 1989.,Proceedings. Workshop on Mar. 20-22, 1989 pp. 2-12.*

Bruce D. Lucas, and Takeo Kanade, "An Iterative Image Registration Technique with an Application to Stereo Vision," in Proc 7th Intl. Joint Conf on Artificial Intellegence (IJCAI) 1981, Aug. 24-28, pp. 674-679.

Jianbo Shi and Carlo Tomasi, "Good Features to Track," IEEE Conference on Computer Vision and Pattern Recognition, Jun. 1994, pp. 593-600 (copy comprises 8 unnumbered pages).

Ross Cutler and Larry Davis, "Robust Real-Time Periodic Motion Detection, Analysis, and Applications," University of Maryland, pp. 1-35.

Stan Birchfield and Carlo Tomasi, "Multiway Cut for Stereo and Motion with Slanted Surfaces," International Conference on Computer Vision, Sep. 1999 (copy comprises 7 unnumbered pages).

Paul Viola and Michael Jones, "Rapid Object Detection Using a Boosted Cascade of Simple Features," Accepted Conference on Computer Vision and Pattern Recognition, 2001, pp. 1-9.

M. Irani and P. Anandan, "All About Direct Methods," Date Unknown, pp. 1-12.

Gregory D. Hager and Peter N. Belhumeur, "Real-Time Tracking of Image Regions with Changes in Geometry and Illumination," Proc. of the IEEE Conference on Computer Vision and Pattern Recognition, 1996 (copy comprises 9 unnumbered pages).

(Continued)

*Primary Examiner*—Tom Y Lu

(57) ABSTRACT

In one embodiment, the present invention is a method and apparatus for autonomous object tracking. In one embodiment, a method for tracking a moving object across at least a portion of a video signal made up of a plurality of image frames includes stabilizing the video signal by processing selected portions of selected image frames, detecting at least one movement in the stabilized video signal, and computing a location of the detected movement(s).

33 Claims, 5 Drawing Sheets

OTHER PUBLICATIONS

Gregory D. Hager and Peter N. Belhumeur, "Efficient Region Tracking with Parametric Models of Geometry and Illumination," IEEE Trans on PAMI, Date Unknown, pp. 1-34.

Carlo Tomasi and Takeo Kanade, "Detection and Tracking of Point Features," Carnegie Mellon University Technical Report, CMU-CS-91-132, Apr. 1991, pp. 1-20.

* cited by examiner

METHOD AND APPARATUS FOR AUTONOMOUS OBJECT TRACKING

REFERENCE TO GOVERNMENT FUNDING

This invention was made with Government support under contract number N00014-03-C-0408 awarded by the Office of Naval Research and with Government support under contract number NBCHC030043 awarded by the Department of the Interior/National Business Center. The Government has certain rights in this invention.

FIELD OF THE INVENTION

The present invention relates generally to computer vision and relates more particularly to object tracking.

BACKGROUND OF THE INVENTION

Surveillance applications are increasingly deploying unmanned vehicles, including unmanned aerial vehicles (UAVs), to aid in object tracking. Unmanned vehicles are remotely piloted or self-piloted vehicles that can carry cargo such as cameras, sensors and communications equipment. They have been used in a reconnaissance and intelligence-gathering role since the 1950s.

Many of these applications include tracking moving objects by mounting an image capturing device (e.g., a video camera) to the unmanned vehicle. Typically, the image capturing device captures video of the object being tracked and sends the video signal to a base station with which the unmanned vehicle is in communication. The base station then stabilizes the video signal and tracks the object.

Although such an arrangement provides reliable tracking capabilities in many circumstances, it also imposes limits on the range of the unmanned vehicle, as well as the types of tasks that the unmanned vehicle may perform, because the unmanned vehicle must be in constant communication with the base station, which performs the video stabilization and tracking. However, to date, few viable alternatives to this arrangement have been proposed, because the sizes and power requirements for the stabilization and tracking equipment make them too large to feasibly incorporate in the unmanned vehicle itself.

Thus, there is a need in the art for a method and apparatus for autonomous object tracking.

SUMMARY OF THE INVENTION

In one embodiment, the present invention is a method and apparatus for autonomous object tracking. In one embodiment, a method for tracking a moving object across at least a portion of a video signal made up of a plurality of image frames includes stabilizing the video signal by processing selected portions of selected image frames, detecting at least one movement in the stabilized video signal, and computing a location of the detected movement(s).

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to autonomous object tracking. Embodiments of the invention provide a small form factor apparatus and concomitant method that allow a single system or device to record images of a field of view, stabilize those images, and track moving objects within the field of view. Such capabilities may be particularly useful for surveillance applications, including those that use unmanned vehicles to record the images. However, the present invention is understood not to be limited to application in unmanned vehicles and may be extended to any sort of video application in which cancellation or minimization of camera or scene motion is desired (e.g., plug-ins for video editing, surveillance systems, mosaics, etc).

Figure 1:
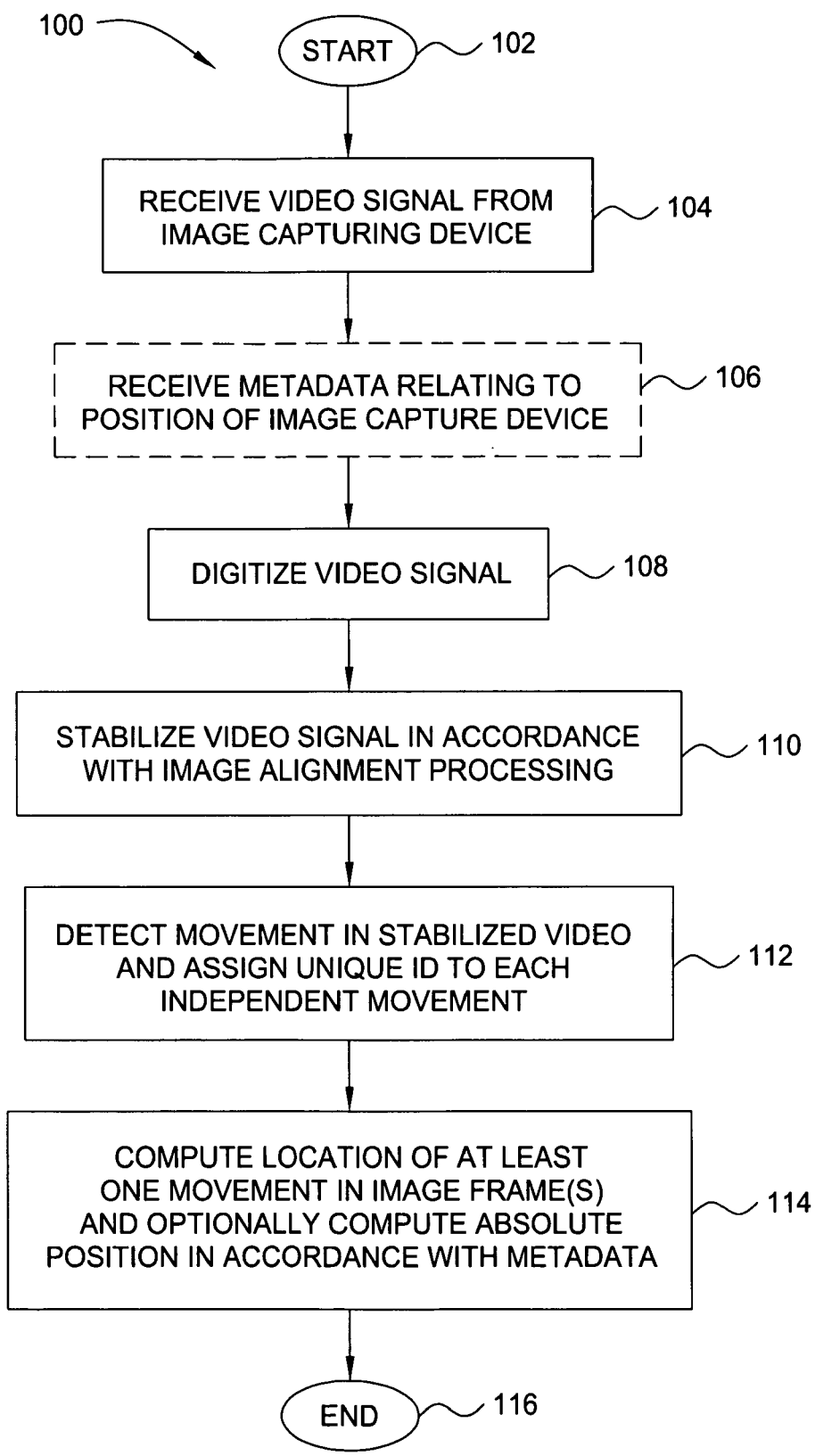
FIG. 1 is a flow diagram illustrating one embodiment of a method for tracking of objects, according to the present invention.

FIG. 1 is a flow diagram illustrating one embodiment of a method 100 for tracking of objects, according to the present invention. The method 100 may be implemented in a computer system deployed, for example, in an unmanned vehicle (such as an unmanned aerial vehicle) to enhance the unmanned vehicle's ability to track moving objects.

The method 100 is initialized at step 102 and proceeds to step 104, where the method 100 receives a video signal from an image capturing device. The video signal comprises a plurality of image frames. In optional step 106 (illustrated in phantom), the method 100 further receives (e.g., from a positioning device such as a global positioning system device) metadata relating to the position of the image capturing device. In one embodiment, the position comprises at least one of: latitude, longitude, altitude, orientation or zoom.

In step 108, the method 100 digitizes the video signal, if the video signal is not already output in digital form from the image capturing device. The method 100 then proceeds to step 110 and stabilizes the digitized video signal. In one embodiment, stabilization in accordance with step 110 is performed in accordance with an image alignment process, as described in greater detail below.

In step 112, the method 100 detects movement in the stabilized video (e.g., over a plurality of frames) and assigns a unique identifier to each independent movement. In some embodiments, the step of detecting movement may comprise two phases, depending on the detection technique that is implemented. For example, the technique described by Cutler and Davis in "Robust Real-Time Periodic Motion Detection, Analysis, and Applications", IEEE T-PAMI, 22(8):781-796 (2000), which is herein incorporated by reference, comprises a first phase that detects pixels that have changed in the image frames being compared and a second phase that groups the detected pixels into regions. In an embodiment where such a two-phase detection process is applied to an interlaced video signal (i.e., a video signal in which each frame comprises a first field with odd-numbered lines and a second field with even-numbered lines), the first phase is carried out separately on each of the first and second field, and the results are combined before carrying out the second phase on the combined result.

The method 100 then proceeds to step 114 and computes, for at least one of the uniquely identified movements, a location of the movement in the image frame(s). Optionally, if positional metadata has been provided (e.g., in optional step 106), the method 100 additionally computes the absolute position (e.g., in latitude, longitude and/or altitude) of the movement. The method 100 then terminates in step 116.

The method 100 thus provides a simple, on-board means for an unmanned vehicle to perform stabilization and tracking operations on an incoming video signal (e.g., as recorded by an image capturing device mounted to the unmanned vehicle). This capability makes it unnecessary for the unmanned vehicle to check in with a base station, for example to exchange recorded video signals (i.e., recorded at the unmanned vehicle) and object tracking information (i.e., generated by the base station). This greatly improves the range of an unmanned vehicle executing the method 100, because the unmanned vehicle is able to record, stabilize and track video signals autonomously, from substantially any location.

Figure 2:
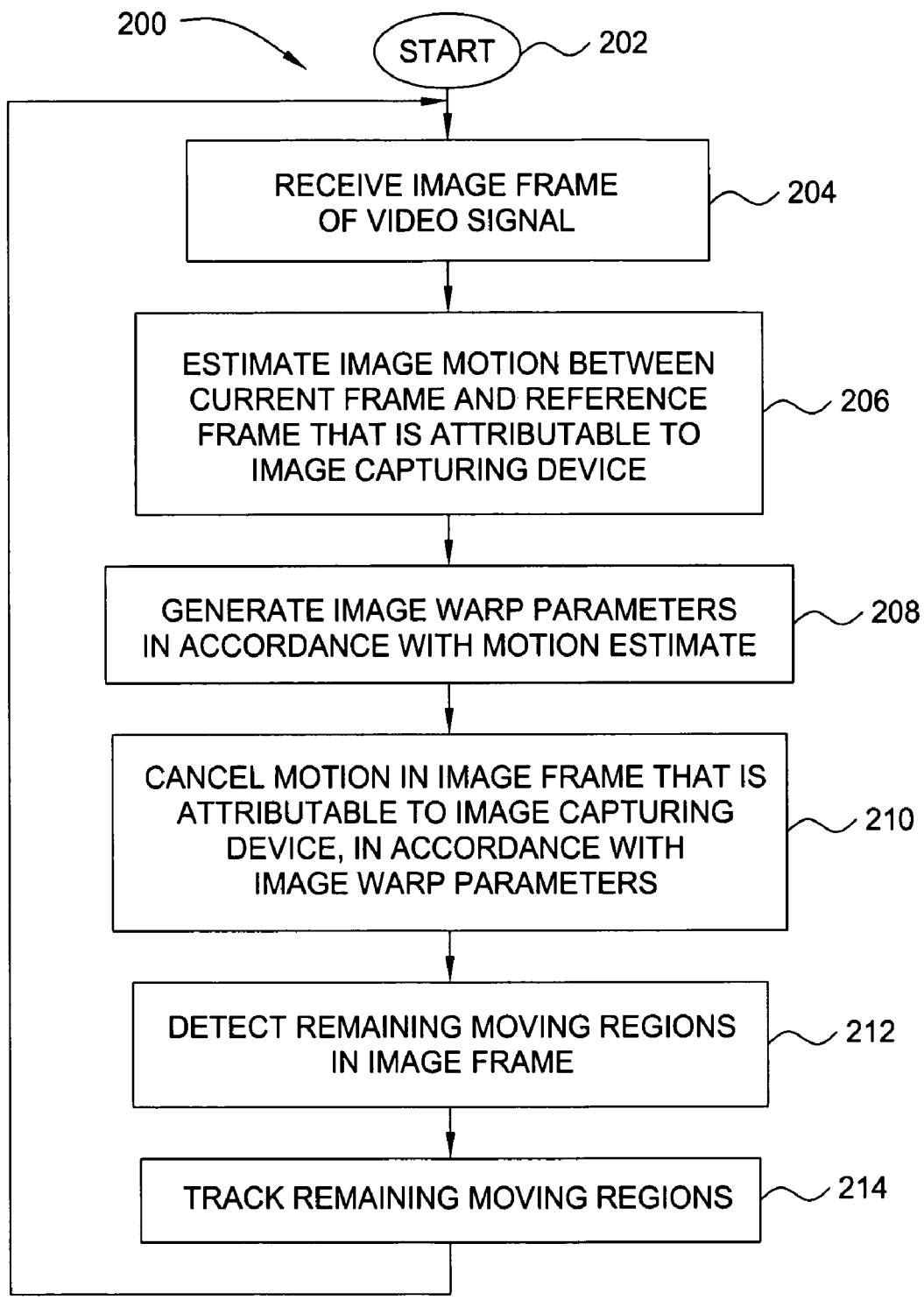
FIG. 2 is a flow diagram illustrating one embodiment of a method for stabilizing and tracking a video signal, according to the present invention.

FIG. 2 is a flow diagram illustrating one embodiment of a method 200 for stabilizing and tracking a video signal, according to the present invention. The method 200 may be implemented, for example, in accordance with steps 110-112 of the method 100, described above.

The method 200 is initialized at step 202 and proceeds to step 204, where the method 200 receives a frame of a video signal (i.e., where the video signal comprises a stream of frames). The video signal frame may be received, for example, from an image capturing device that is mounted to the unmanned vehicle. In one embodiment, the video signal is digitized before the frame is received. In another embodiment, the frame is digitized upon reception.

In step 206, the method 200 estimates the image motion between the current frame of the video signal and a previous frame (or "reference frame") of the video signal (which, presumably, has already been processed by the method 200). Specifically, in step 206, the method 200 estimates the motion between the current frame and the reference frame that is attributable to the image capturing device (e.g., due to movement of the image capturing device such as vibration, shaking, zoom, rotation, etc.). In one embodiment, the motion attributable to the image capturing device is estimated in accordance with a variation of the Kanade-Lucas-Tomasi (KLT) algorithm, described in greater detail below with respect to FIG. 3. In one embodiment, the reference frame is the immediately previous frame in the video signal. In another embodiment, the reference frame is a previous frame that is regularly re-selected. For example, a new reference frame may be selected every n frames (i.e., such that the same reference frame is used to process every n frames of the video signal). In a further embodiment, a new reference frame may be selected sooner than every n frames if a trigger condition occurs (e.g., at least one of: small overlap between the reference frame and the current frame, large distortion in the motion between the reference frame and the current frame, or interruption of the video signal).

In step 208, the method 200 generates image warp parameters, in accordance with the motion estimate generated in step 206. The method 200 then proceeds to step 210 and cancels the motion in the image frame that is attributable to the image capturing device, in accordance with the image warp parameters.

In step 212, the method 200 detects the remaining moving regions in the image frame. Since the motion attributable to the image capturing device is cancelled in step 210, it is assumed that any motion remaining in the image frame represents moving objects in the image capturing device's field of view (i.e., potential targets for object tracking). Thus, once the remaining moving regions have been detected in the image frame, the remaining moving regions are tracked in step 214. In one embodiment, tracking of moving regions is performed in accordance with the methods described by Cutler and Davis, supra. The method 100 then returns to step 204 and proceeds as described above to process the next frame of the video signal.

In some cases, the video signal may be interlaced (i.e., each frame of the video signal comprises a first field with odd-numbered lines and a second field with even-numbered lines). In such a case, the first and second fields of each frame are separated prior to estimating the image motion in step 206. Steps 206-210 are then performed separately on each field.

Figure 3:
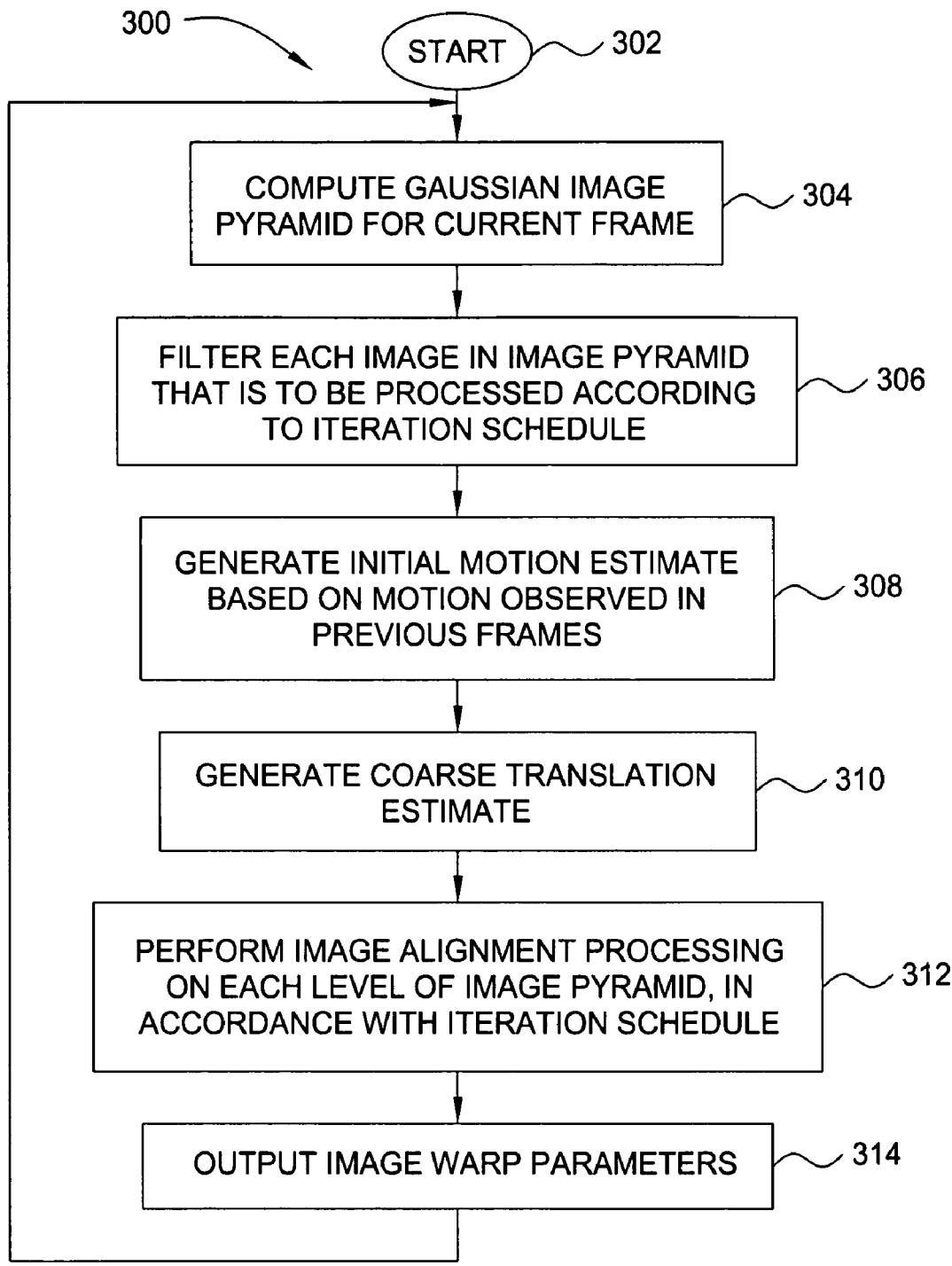
FIG. 3 is a flow diagram illustrating one embodiment of a method for stabilizing a video signal, according to the present invention.

FIG. 3 is a flow diagram illustrating one embodiment of a method 300 for stabilizing a video signal, according to the present invention. The method 300 may be implemented, for example, in accordance with steps 206-208 of the method 200, discussed above.

The method 300 is initialized at step 302 and proceeds to step 304, where the method 300 computes a Gaussian image pyramid for the current image frame of the video signal. The Gaussian image pyramid comprises a hierarchy of low-pass filtered versions (images) of the original current image frame, such that successive levels correspond to lower frequencies.

In step 306, the method 300 filters each image in the Gaussian image pyramid, if the image is identified by an iteration schedule as an image that is to be processed. In one embodiment, the iteration schedule specifies, for a given frame, which images and/or levels in the Gaussian image pyramid are to be processed to estimate the motion between the given frame and the reference frame. For example, the method 300 may operate more quickly if some levels of the Gaussian image pyramid are not processed, as described in greater detail below. The filtering performed in step 306 is in addition to any smoothing and Laplacian that is applied to the images in the initial computation of the Gaussian image pyramid.

In step 308, the method 300 generates an initial motion estimate (for the motion attributable to the image capturing device) between the current frame and the reference frame, based on the observed motions of the previous frames of the video signal (which have already been processed). Specifically, the motion parameters (i.e., all parameters used to represent the image motion, which is application dependent, including: image translation, scale change, rotation, affine coefficients and projective coefficients) of the previous frames are extrapolated (e.g., by linear extrapolation) to generate the initial motion estimate.

In step 310, the method 300 generates a coarse translation estimate. The coarse translation estimate is an estimate of the translation (x, y shift) component of the motion between the current frame and the reference frame. In one embodiment, the coarse translation estimate is generated by correlating the coarsest level of the current image frame's Gaussian image pyramid to the coarsest level of the reference frame's Gaussian image pyramid. For example, the current image frame might first be warped using the initial motion estimate, and then shifted by various amounts in the x and y directions. For each shift, the absolute difference between the current image frame and the reference frame is measured, and the shift (translation) with the lowest absolute difference is selected as the coarse translation estimate. The resultant coarse translation estimate is used to refine the initial motion estimate. In one embodiment, refinement of the initial motion estimate is achieved by composition, assuming that the predicted motion warp of the initial motion estimate was applied to the current image frame before computing the coarse translation estimate. Specifically, the refining composition in this case would involve applying the predicted motion (as defined by the initial motion estimate), followed by the translation (as defined by the coarse translation estimate). It is understood that steps 304-306 have already been performed on the reference image in earlier processing.

In step 312, the method 300 performs image alignment processing on each level of the Gaussian image pyramid, in accordance with the iteration schedule (i.e., each level identified by the iteration schedule is processed), in order to compute the image warp parameters. In one embodiment, the image alignment processing starts with the coarsest level and ends with the finest level. In one embodiment, the image alignment processing is performed in accordance with the known Lucas-Kanade algorithm (as described, for example, by Hager and Belhumeur in "Efficient region tracking with parametric models of geometry and illumination", IEEE Trans. PAMI, Vol. 20:10, October 1998, p. 1025, which is herein incorporated by reference), for a predefined number of iterations, in order to further refine the motion estimate. In one embodiment, the number of iterations is defined in accordance with an iteration schedule.

As described above, the iteration schedule defines the number of iterations (if any) of image alignment processing (e.g., Lucas-Kanade processing) that are to be applied to each level of the Gaussian image pyramid computed for a given image frame. For example, a tracking application may require only ten to fifteen image frames per second of a video signal with high-resolution image warps, while the stabilization application may require at least coarse image motion estimates for twenty to thirty frames per second. The method 300 can satisfy the requirements of both the tracking and stabilization applications, for example by defining an iteration schedule that requires non-zero iterations at the finest resolution of the Gaussian image pyramid for only approximately ten to fifteen frames per second and non-zero iterations at the coarsest level of the Gaussian image pyramid for approximately twenty to thirty frames per second.

Since the coarsest level of the Gaussian image pyramid is associated with a smaller image, skipping image alignment processing for the finest level of the Gaussian image pyramid for most of the frames of a video signal will significantly speed up the stabilization process (e.g., as embodied in the method 300). In addition, skipping image alignment processing entirely for a given level of the Gaussian image pyramid or a given frame allows the method 300 to skip the image filtering step (i.e., step 304), which also speeds up the stabilization process. In one embodiment, the iteration schedule (including all combinations of iterations, frames and levels), as well as any other schedule indexed by frame and/or level, is definable by the user. In a further embodiment, the iteration schedule is definable in matrix form.

In a further embodiment, only portions of each selected image ("image chips") in the Gaussian image pyramid are processed at each level. In one embodiment, these portions are selected by first dividing a given image into an m by m array of zones, and then selecting a portion or chip within each zone having the highest texture value. The texture of the selected portions is sufficient to result in a change in computed motion error when any type of change is made to the image motion estimate. In one embodiment, the texture within each potential portion is defined as the absolute value of the convolution of the Laplacian averaged over a region the size of the portion (e.g., via boxcar filter). The total area of the image that is covered by these portions is some predefined fraction of the image (e.g., 25%), and the distribution of the portions is selected for sufficient correction of motion error. The size of the portions is further selected for maximum speed (for stabilization processing). For example, for a fixed percentage of coverage of the given image, more portions are required if the portions are relatively small, and this will increase the overall processing overhead. However, the smaller the portion, the more likely it is that the processing will benefit from high-speed cache memories (where this benefit is machine-dependent).

In a further embodiment still, the reference frame is pre-processed to facilitate image alignment processing in accordance with step 312. In one embodiment, pre-processing of the reference frame comprises first computing, once per reference frame, the product images ("motion templates") that are used to fill the matrix part of the linearized minimization. Integral images are then computed from each motion template to allow fast filling of the minimization matrix, each iteration of each frame to be processed (e.g., the current image frames), in spite of the potentially different regions of intersection between the reference frame and the current image frame. One method for computing integral images that may be implemented to advantage in accordance with the present application is described by Viola and Jones in "Rapid object detection using a boosted cascade of simple features", IEEE Computer Society Conference on Computer Vision and Pattern Recognition (December 2001), which is herein incorporated by reference.

Once all levels of the Gaussian image pyramid have been processed in accordance with the image alignment processing and the iteration schedule, and the resultant image warp parameters have been computed, the method 300 proceeds to step 314 and outputs the image warp parameters (e.g., to a tracking application). The method 300 then returns to step 302 and proceeds as described above to stabilize a subsequent frame of the video signal.

Figure 4:
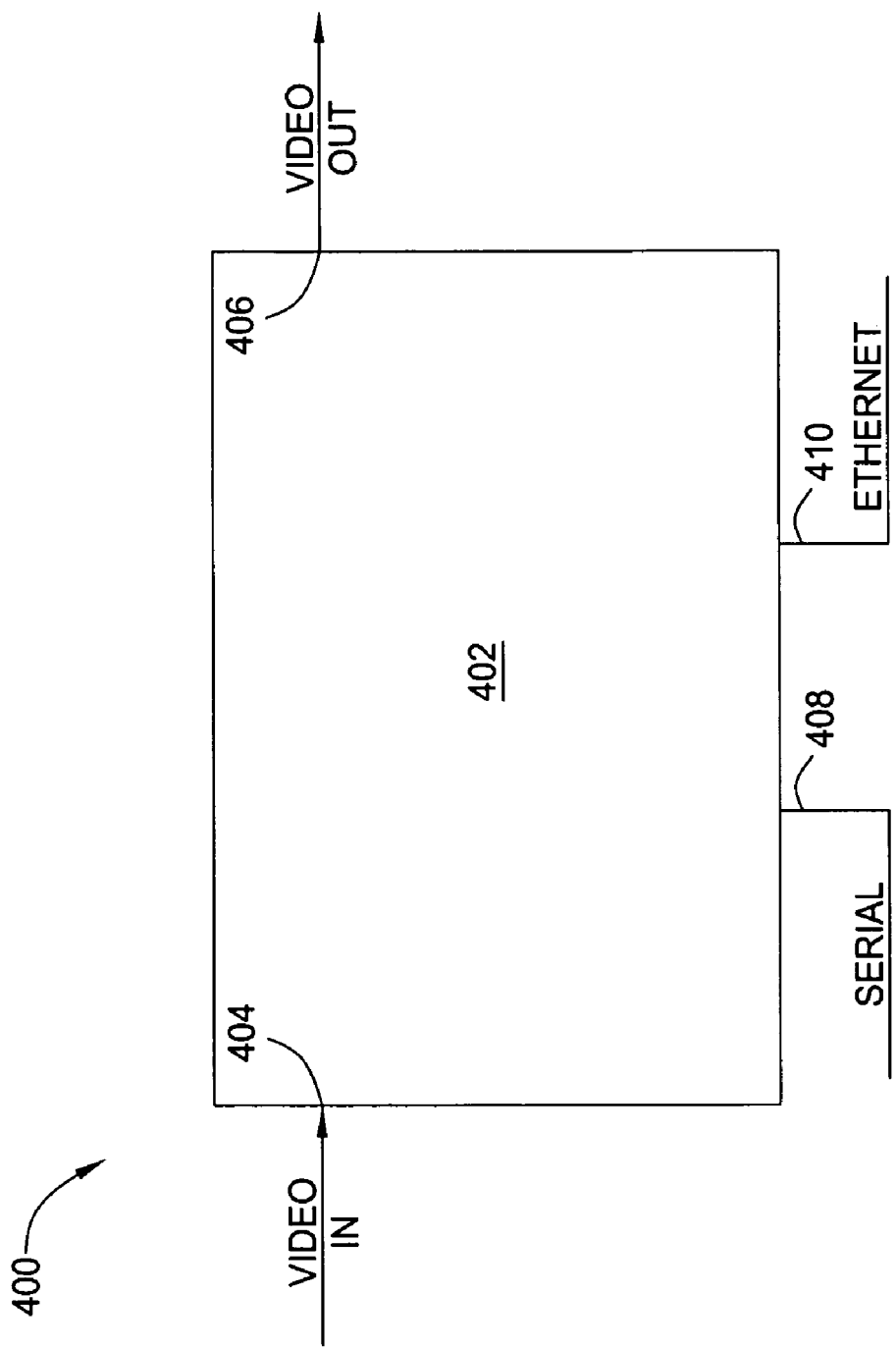
FIG. 4 is a schematic diagram illustrating one embodiment of an apparatus for autonomous object tracking, according to the present invention.

FIG. 4 is a schematic diagram illustrating one embodiment of an apparatus 400 for autonomous object tracking, according to the present invention. The apparatus 400 comprises a small form factor general purpose computing device 402 having a video input port 404, a video output port 406, a serial interface 408 and an Ethernet interface 410.

In one embodiment, the general purpose computing device 402 is a PC/104 standard personal computer including a compact flash slot for flash memory (where software embodying the methods described above is stored in the flash memory). In such an embodiment, the video input port 404 is a PC/104 frame grabber/digitization card that is adapted to receive an incoming video signal (e.g., directly from an image capturing device, not shown). In one embodiment, the video input port 404 receives incoming video signals at approximately 30 frames per second. Alternatively, the video signal may be received via the serial interface 408 rather than displayed locally. The serial interface 408 is further adapted to receive metadata and other information from a positioning device (e.g., a global positioning system device), including the position, latitude, longitude, altitude, orientation and/or zoom of the image capturing device, and to communicate the position (s) of one or more tracked objects (in latitude, longitude and/or altitude). Alternatively, the same information may be received and communicated using different protocols via the Ethernet interface 410. The positions may also be output via the video output port 408.

The apparatus 400 is low-power (e.g., consumes less than or equal to approximately ten Watts) and is small enough to be integrated on-board in unmanned vehicles, including unmanned aerial vehicles. Moreover, because the methods for stabilization and tracking are stored on the compact flash memory, simple software installation allows for easy upgrade. Thus, upgrades are more easily accomplished than in systems that rely on hardware chips.

Figure 5:
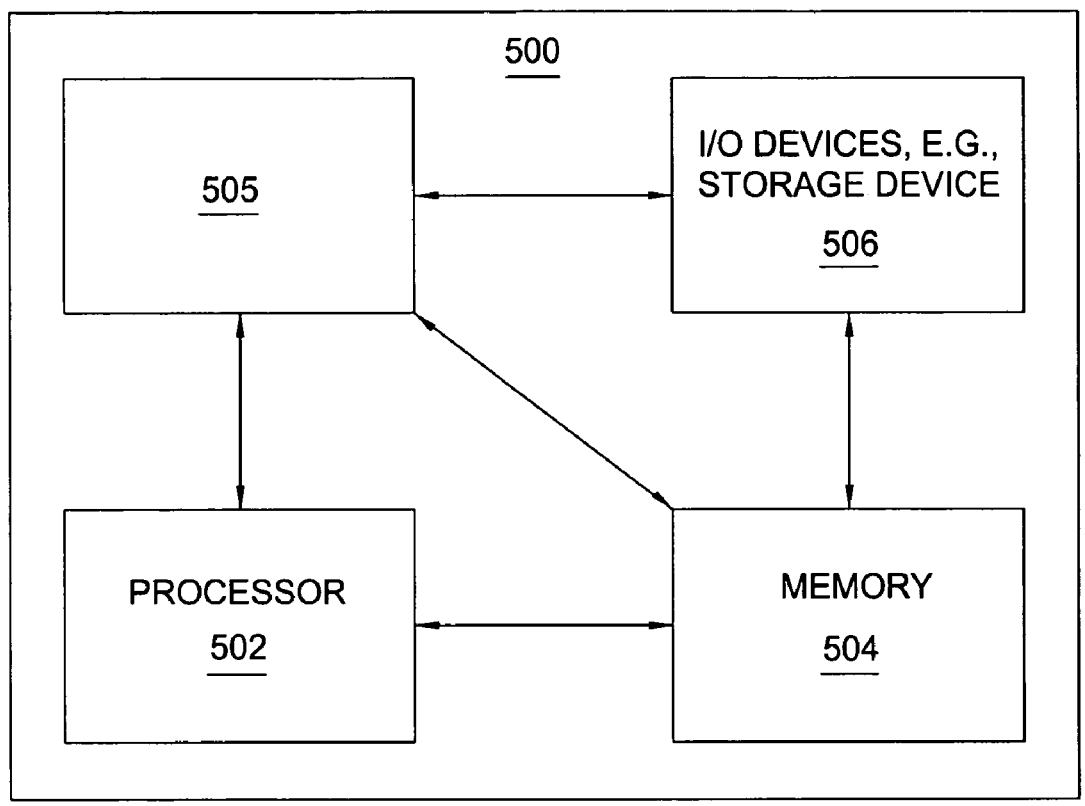
FIG. 5 is a high level block diagram of the object tracking method that is implemented using a general purpose computing device.

FIG. 5 is a high level block diagram of the object tracking method that is implemented using a general purpose computing device 500 (e.g., such as the general purpose computing device that is described with reference to FIG. 4). In one embodiment, a general purpose computing device 500 comprises a processor 502, a memory 504 (e.g., a flash memory), an object tracking module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the object tracking module 505 can be implemented as a physical device or subsystem that is coupled to a processor through a communication channel.

Alternatively, the object tracking module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the object tracking module 505 for tracking moving objects described herein with reference to the preceding Figures can be stored on a computer readable medium or carrier (e.g., RAM, magnetic or optical drive or diskette, and the like).

Thus, the present invention represents a significant advancement in the field of computer vision. Embodiments of the invention provide a small form factor apparatus and concomitant method that allow a single system or device to record images of a field of view, stabilize those images, and track moving objects within the field of view. Such capabilities may be particularly useful for surveillance applications, including those that use unmanned vehicles to record the images. However, the present invention is understood not to be limited to application in unmanned vehicles and may be extended to any sort of video application in which cancellation or minimization of camera or scene motion is desired (e.g., plug-ins for video editing, surveillance systems, mosaics, etc).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for tracking a moving object across at least a portion of a video signal comprising a plurality of image frames, the method comprising:
using a processor to perform steps comprising:
stabilizing the video signal by processing only selected portions of selected frames from among the plurality of image frames to produce a stabilized video signal, wherein said selected portions of said selected frames cover less than a total area of said selected frames and have highest texture values with said selected frames;
detecting at least one movement in the stabilized video signal; and
computing a location of the at least one movement.

2. The method of claim 1, wherein the stabilizing comprises:
computing a Gaussian image pyramid for each of the selected frames, the Gaussian image pyramid comprising a plurality of levels of images;
for each of the selected frames, generating an initial motion estimate between the selected frame and a reference frame, the initial motion estimate predicting a predicted movement that is attributable to an image capturing device from which the video signal is received;
generating a coarse translation estimate for the predicted movement that is attributable to the image capturing device, to produce a refined motion estimate;
performing image alignment processing on selected levels of the Gaussian image pyramid, to produce a further refined motion estimate; and
computing one or more image warp parameters in accordance with the further refined motion estimate.

3. The method of claim 2, further comprising:
filtering selected images in the Gaussian image pyramid prior to generating the initial motion estimate.

4. The method of claim 2, wherein the initial motion estimate is generated in accordance with one or more movements observed in one or more image frames of the video signal preceding the reference frame.

5. The method of claim 2, wherein the coarse translation estimate is generated in accordance with correlation at a coarsest one of the plurality of levels of the Gaussian image pyramid.

6. The method of claim 2, wherein the image alignment processing is performed in accordance with one or more iterations as defined by an iteration schedule.

7. The method of claim 6, wherein the iteration schedule defines a number of iterations of the image alignment processing to be performed on the selected frames and the selected levels of the Gaussian image pyramid.

8. The method of claim 7, wherein the number of iterations varies according to a given one of the selected frames or a given one of the selected levels of the Gaussian image pyramid.

9. The method of claim 2, wherein the image alignment processing is performed in accordance with the Lucas-Kanade processing technique.

10. The method of claim 2, wherein only selected portions of each of the images of the Gaussian image pyramid are processed in accordance with the image alignment processing.

11. The method of claim 10, wherein the selected portions of each of the images are selected by:
dividing each of the images into an array of zones; and
selecting within each zone in the array of zones a portion having a highest texture value.

12. The method of claim 11, wherein the a texture value of a given portion is computed in accordance with an absolute value of a Laplacian averaged over a region approximately equal in size to a size of the portion.

13. The method of claim 2, wherein the generating the initial motion estimate further comprises:
pre-processing the reference frame to facilitate the image alignment processing.

14. The method of claim 13, wherein the pre-processing comprises:
computing motion templates used to fill a matrix part of a linearized minimization for the reference frame; and computing, from each of the motion templates, one or more integral images.

15. The method of claim 1, wherein the computing a location of the at least one movement comprises:
   computing a location of the at least one movement in one or more of the plurality of image frames.

16. The method of claim 15, wherein the computing a location of the at least one movement further comprises:
   computing an absolute position of the at least one movement in accordance with positional information relating to an image capturing device from which the video signal is received.

17. A computer readable storage medium containing an executable program for tracking a moving object across at least a portion of a video signal comprising a plurality of image frames, where the program performs the steps of:
   stabilizing the video signal by processing only selected portions of selected frames from among the plurality of image frames to produce a stabilized video signal, wherein said selected portions of said selected frames cover less than a total area of said selected frames and have highest texture values with said selected frames;
   detecting at least one movement in the stabilized video signal; and
   computing a location of the at least one movement.

18. The computer readable storage medium of claim 17, wherein the stabilizing comprises:
   computing a Gaussian image pyramid for each of the selected frames, the Gaussian image pyramid comprising a plurality of levels of images;
   for each of the selected frames, generating an initial motion estimate between the selected frame and a reference frame, the initial motion estimate predicting a predicted movement that is attributable to an image capturing device from which the video signal is received;
   generating a coarse translation estimate for the predicted movement that is attributable to the image capturing device, to produce a refined motion estimate;
   performing image alignment processing on selected levels of the Gaussian image pyramid, to produce a further refined motion estimate; and
   computing one or more image warp parameters in accordance with the further refined motion estimate.

19. The computer readable storage medium of claim 18, further comprising:
   filtering selected images in the Gaussian image pyramid prior to generating the initial motion estimate.

20. The computer readable storage medium of claim 18, wherein the initial motion estimate is generated in accordance with one or more movements observed in one or more image frames of the video signal preceding the reference frame.

21. The computer readable storage medium of claim 18, wherein the coarse translation estimate is generated in accordance with correlation at a coarsest one of the plurality of levels of the Gaussian image pyramid.

22. The computer readable storage medium of claim 18, wherein the image alignment processing is performed in accordance with one or more iterations as defined by an iteration schedule.

23. The computer readable storage medium of claim 22, wherein the iteration schedule defines a number of iterations of the image alignment processing to be performed on the selected frames and the selected levels of the Gaussian image pyramid.

24. The computer readable storage medium of claim 23, wherein the number of iterations varies according to a given one of the selected frames or a given one of the selected levels of the Gaussian image pyramid.

25. The computer readable storage medium of claim 18, wherein the image alignment processing is performed in accordance with the Lucas-Kanade processing technique.

26. The computer readable storage medium of claim 18, wherein only selected portions of each of the images of the Gaussian image pyramid are processed in accordance with the image alignment processing.

27. The computer readable storage medium of claim 26, wherein the selected portions of each of the images are selected by:
   dividing each of the images into an array of zones; and
   selecting within each zone in the array of zones a portion having a highest texture value.

28. The computer readable storage medium of claim 27, wherein a texture value of a given portion is computed in accordance with an absolute value of a Laplacian averaged over a region approximately equal in size to a size of the portion.

29. The computer readable storage medium of claim 18, wherein the generating the initial motion estimate further comprises:
   pre-processing the reference frame to facilitate the image alignment processing.

30. The computer readable storage medium of claim 29, wherein the pre-processing comprises:
   computing motion templates used to fill a matrix part of a linearized minimization for the reference frame; and
   computing, from each of the motion templates, one or more integral images.

31. The computer readable storage medium of claim 17, wherein the computing a location of the at least one movement comprises:
   computing a location of the at least one movement in one or more of the plurality of image frames.

32. The computer readable storage medium of claim 31, wherein the computing a location of the at least one movement further comprises:
   computing an absolute position of the at least one movement in accordance with positional information relating to an image capturing device from which the video signal is received.

33. An apparatus for tracking a moving object across at least a portion of a video signal comprising a plurality of image frames, comprising:
   means for stabilizing the video signal by processing only selected portions of selected frames from among the plurality of image frames to produce a stabilized video signal, wherein said selected portions of said selected frames cover less than a total area of said selected frames and have highest texture values with said selected frames;
   means for detecting at least one movement in the stabilized video signal; and
   means for computing a location of the at least one movement.

* * * * *